United States Patent
Barton et al.

(10) Patent No.: US 7,592,905 B2
(45) Date of Patent: Sep. 22, 2009

(54) APPARATUS AND METHOD TO DETECT THE PRESENCE OF A CHILD IN A VEHICLE

(76) Inventors: Darlene K. Barton, 5802 E. Betty Elyse La., Scottsdale, AZ (US) 85254; Forrest E. Barton, 5802 E. Betty Elyse La., Scottsdale, AZ (US) 85254; Audrey B. Marti, 5802 E. Betty Elyse La., Scottsdale, AZ (US) 85254

( * ) Notice: Subject to any disclaimer, the term of this patent is extended or adjusted under 35 U.S.C. 154(b) by 96 days.

(21) Appl. No.: 11/477,500

(22) Filed: Jun. 28, 2006

(65) Prior Publication Data

US 2008/0001730 A1 Jan. 3, 2008

(51) Int. Cl.
*B60Q 1/00* (2006.01)

(52) U.S. Cl. ............... 340/457; 340/425.5; 340/667

(58) Field of Classification Search ........... 340/667, 340/573.1, 457, 573.4, 571, 693.9
See application file for complete search history.

(56) References Cited

U.S. PATENT DOCUMENTS

| | | | |
|---|---|---|---|
| 5,454,591 A | 10/1995 | Mazur et al. | |
| 5,581,234 A | 12/1996 | Emery et al. | |
| 5,790,031 A * | 8/1998 | Shelton et al. | 340/572.4 |
| 5,793,291 A | 8/1998 | Thornton | |
| 5,949,340 A | 9/1999 | Rossi | |
| 6,104,293 A | 8/2000 | Rossi | |
| 6,243,634 B1 | 6/2001 | Oestreicher et al. | |
| 6,259,167 B1 | 7/2001 | Norton | |
| 6,922,147 B1 | 7/2005 | Viksnins et al. | |
| 6,924,742 B2 | 8/2005 | Mesina | |
| 7,289,035 B2 * | 10/2007 | Nathan et al. | 340/667 |
| 7,321,306 B2 * | 1/2008 | Lee et al. | 340/572.1 |
| 2002/0014963 A1 * | 2/2002 | Trosper | 340/571 |
| 2003/0090371 A1 * | 5/2003 | Teowee et al. | 340/426.24 |
| 2003/0122662 A1 * | 7/2003 | Quinonez | 340/457 |
| 2004/0143378 A1 * | 7/2004 | Vogelsang | 701/35 |
| 2004/0186632 A1 * | 9/2004 | Arai | 701/1 |
| 2005/0030188 A1 * | 2/2005 | Flanagan et al. | 340/667 |

* cited by examiner

*Primary Examiner*—Davetta W Goins
*Assistant Examiner*—Hoi C Lau
(74) *Attorney, Agent, or Firm*—Dale F. Regelman; Quarles & Brady LLP (57) ABSTRACT

Applicants' invention comprises an apparatus and method to detect the presence of a child in a vehicle. Applicants' apparatus comprises a monitoring assembly comprising a pressure transducer, a first processor, and a monitoring transmitter. Applicants' apparatus further comprises a vehicle controller assembly comprising a second processor, a receiver, and a transceiver, wherein the receiver is capable of communicating with the monitoring transmitter. Applicants' apparatus further comprises a key fob comprising an RFID circuit, wherein Applicants' transceiver is capable of communicating with that RFID circuit.

15 Claims, 10 Drawing Sheets

APPARATUS AND METHOD TO DETECT THE PRESENCE OF A CHILD IN A VEHICLE

FIELD OF THE INVENTION

The invention relates to an apparatus' and method to detect the presence of a child and/or a pet in a vehicle.

BACKGROUND OF THE INVENTION

Children and/or pets are sometimes left unattended in a vehicle. Depending on, among other factors, the ambient weather such unattended children and/or pets may suffer injury or death as a result.

What is needed is an apparatus and method to detect the presence of a child and/or pet in an otherwise unattended vehicle, and to provide an audible and/or visual alert to persons in near vicinity to that vehicle.

SUMMARY OF THE INVENTION

Applicants' invention comprises an apparatus and method to detect the presence of a child in a vehicle. Applicants' apparatus comprises a monitoring assembly comprising a pressure transducer, a first processor, and a monitoring transmitter. Applicants' apparatus further comprises a vehicle controller assembly comprising a second processor, a receiver, and a transceiver, wherein the receiver is capable of communicating with the monitoring transmitter. Applicants' apparatus further comprises a key fob comprising an RFID circuit, wherein Applicants' transceiver provides interrogation signals to, and receives response signals from, the RFID circuit.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Applicants' apparatus and method utilize three different devices. A first device, Applicants' monitoring assembly 100, detects the presence of a child/pet in a vehicle. That monitoring assembly 100 provides activation signals to Applicants' vehicle controller assembly 200. Applicants' vehicle controller assembly 200 comprises an RFID reader.

A key fob comprises an RFID tag. The one or more keys used to operate the vehicle are attached to Applicants' key fob. After Applicants' controller assembly 200 has been activated by receiving an activation signal from monitoring assembly 100, controller assembly 200 emits RFID interrogation signals, which may be received by the RFID circuit disposed in the key fob. In response to receiving RFID interrogation signals, the key fob provides response signals to controller assembly 200.

Communication between Applicants' vehicle controller assembly 200 and Applicants' key fob is limited to about 20 feet. As a result, if the key fob is transported a distance greater than about 20 feet from the vehicle, then the key fob no longer can receive interrogation signals from controller assembly 200. In the event controller assembly 200, once activated, no longer receives response signals from the key fob, then Applicants' controller assembly 200 causes the vehicle horn to beep, and/or causes the vehicles head lamps to flash, and/or causes a alert signal to be sent via an interconnected cellular telephone.

Figure 1:
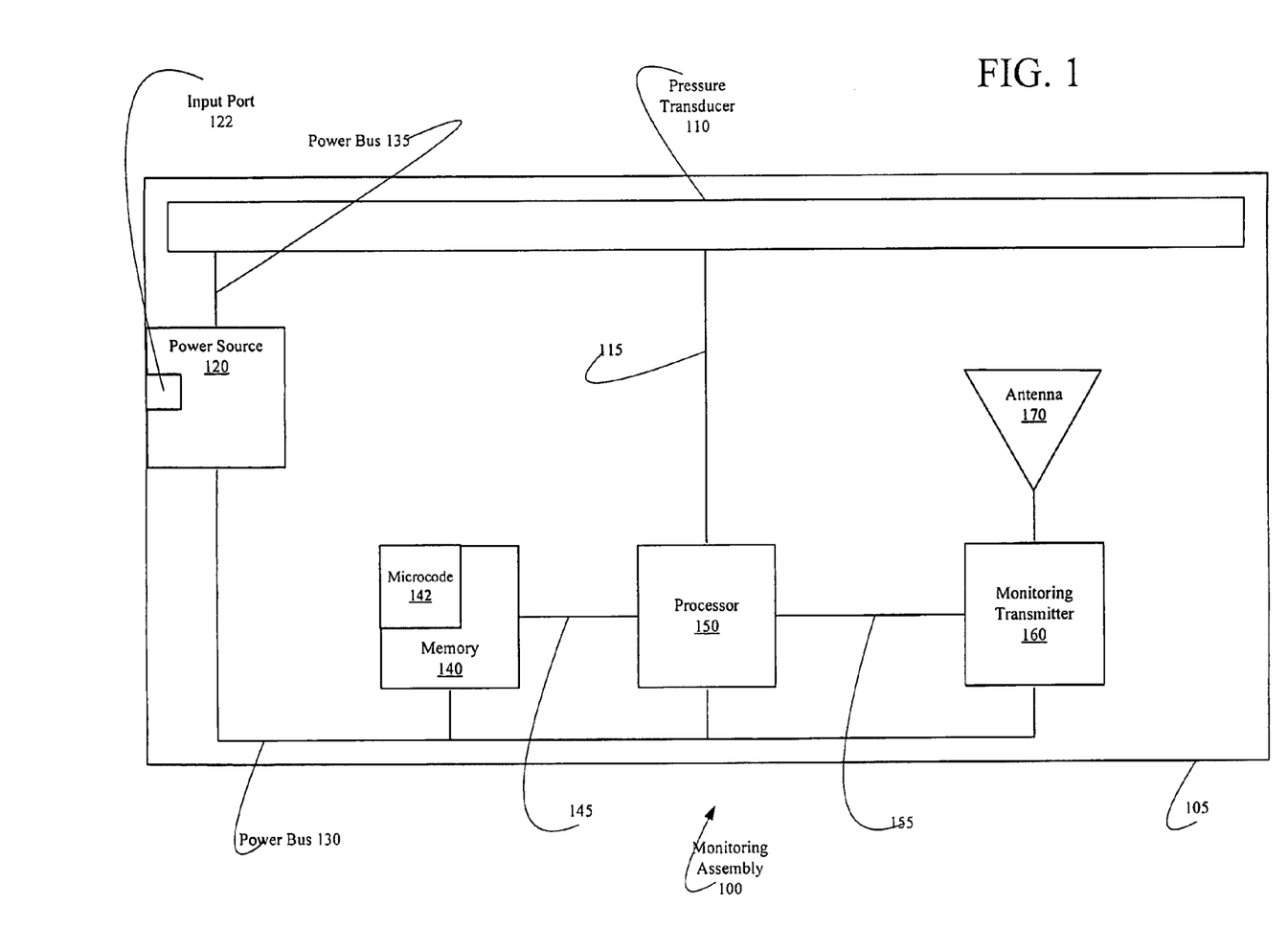
FIG. 1 is a block diagram illustrating Applicants' monitoring assembly.

Referring now to FIG. 1, Applicants' monitoring assembly 100 comprises pressure transducer 110, power source 120, memory 140, processor 150, monitoring transmitter 160, and antenna 170. Power source 120 is interconnected with memory 140, processor 150, and monitoring transmitter 160 via power bus 130. Power source 120 is interconnected with pressure transducer via power bus 135.

In certain embodiments, power source 120 comprises one or more batteries. In certain embodiments, those one or more batteries comprise rechargeable batteries. In certain of these rechargeable battery embodiments, power source 120 comprises power input port 122 into which an external power source may be releaseably interconnected with power source 120 to recharge the one or more batteries. In certain embodiments, the external power source comprises the electrical system of vehicle in which monitoring assembly 100 is disposed.

Pressure transducer 110 is interconnected with processor 150 via communication link 115. Monitoring transmitter 160 is interconnected with processor 150 via communication link 155. Memory 140 is interconnected with processor 150 via communication link 145. Communication links 115, 145, and 155, may comprise any type of I/O interface, for example and without limitation, a serial connection, parallel connection, Fibre Channel, Infiniband, Gigabit Ethernet, Ethernet, iSCSI, SCSI I/O interface, and the like.

Microcode/operating system 142 is encoded in memory 140. Processor 150 utilizes microcode/operating system 142 to operate device 100. In certain embodiments, operating system 142 is selected from the group consisting of Windows, AIX, Unix, MVS, and LINUX. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In certain embodiments, memory 140 comprises an information storage medium comprising, for example, a magnetic information storage medium, an optical information storage medium, an electronic information storage medium, and the like, in combination with hardware to read information from that information storage medium. By "electronic storage media," Applicants mean, for example, a device such as a PROM, EPROM, EEPROM, Flash PROM, compactflash, smartmedia, and the like. In certain embodiments, memory 140 comprises nonvolatile memory.

In certain embodiments, Applicants' monitoring transmitter 160 transmits wireless signals compliant with one or more of the embodiments of IEEE Specification 802.11 (collectively the "IEEE Specification"). As those skilled in the art will appreciate, the IEEE Specification comprises a family of specifications developed by the IEEE for wireless LAN technology.

Figure 2A:
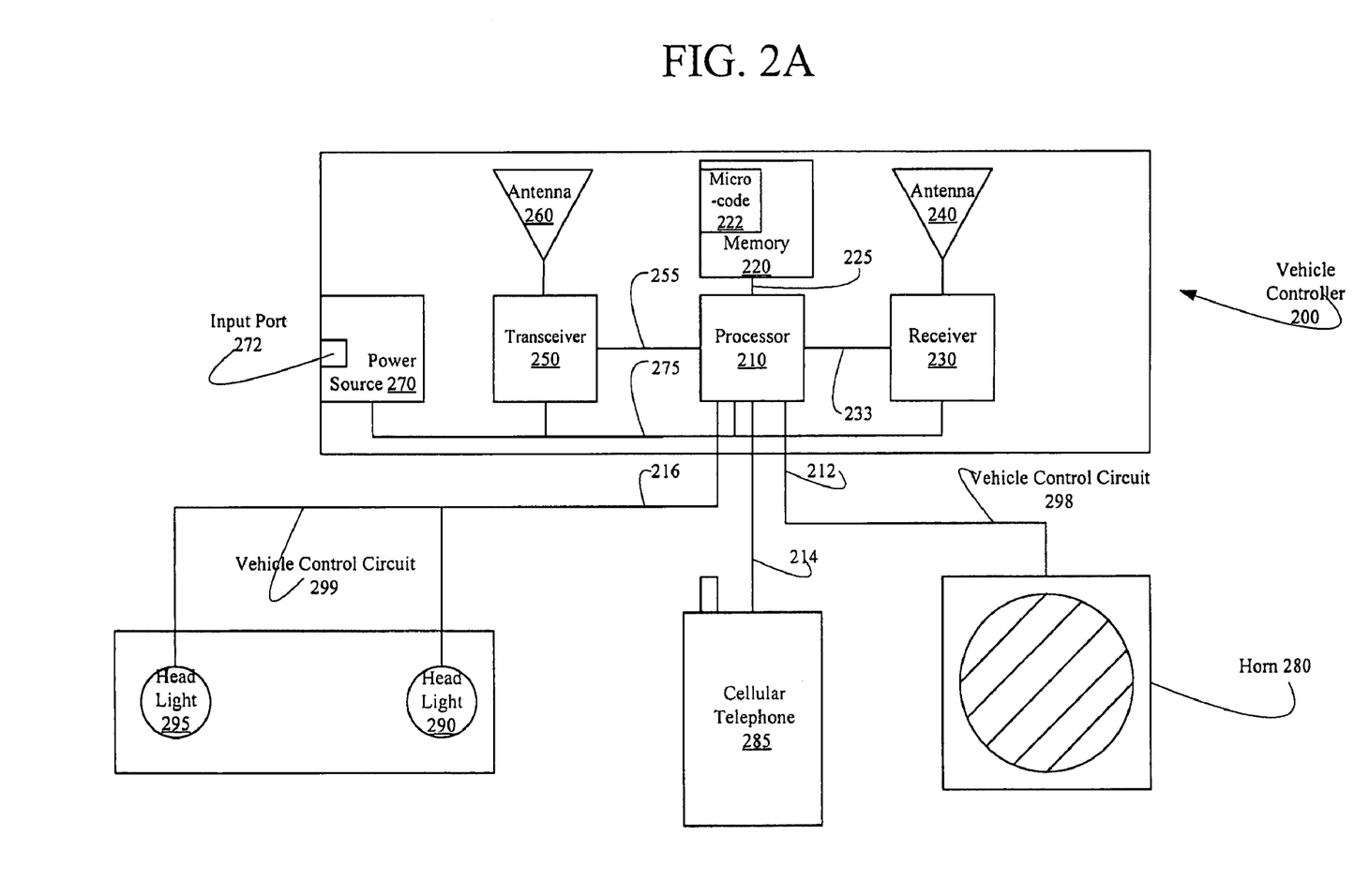
FIG. 2A is a block diagram illustrating a first embodiment of Applicants' vehicle controller assembly.
Figure 2B:
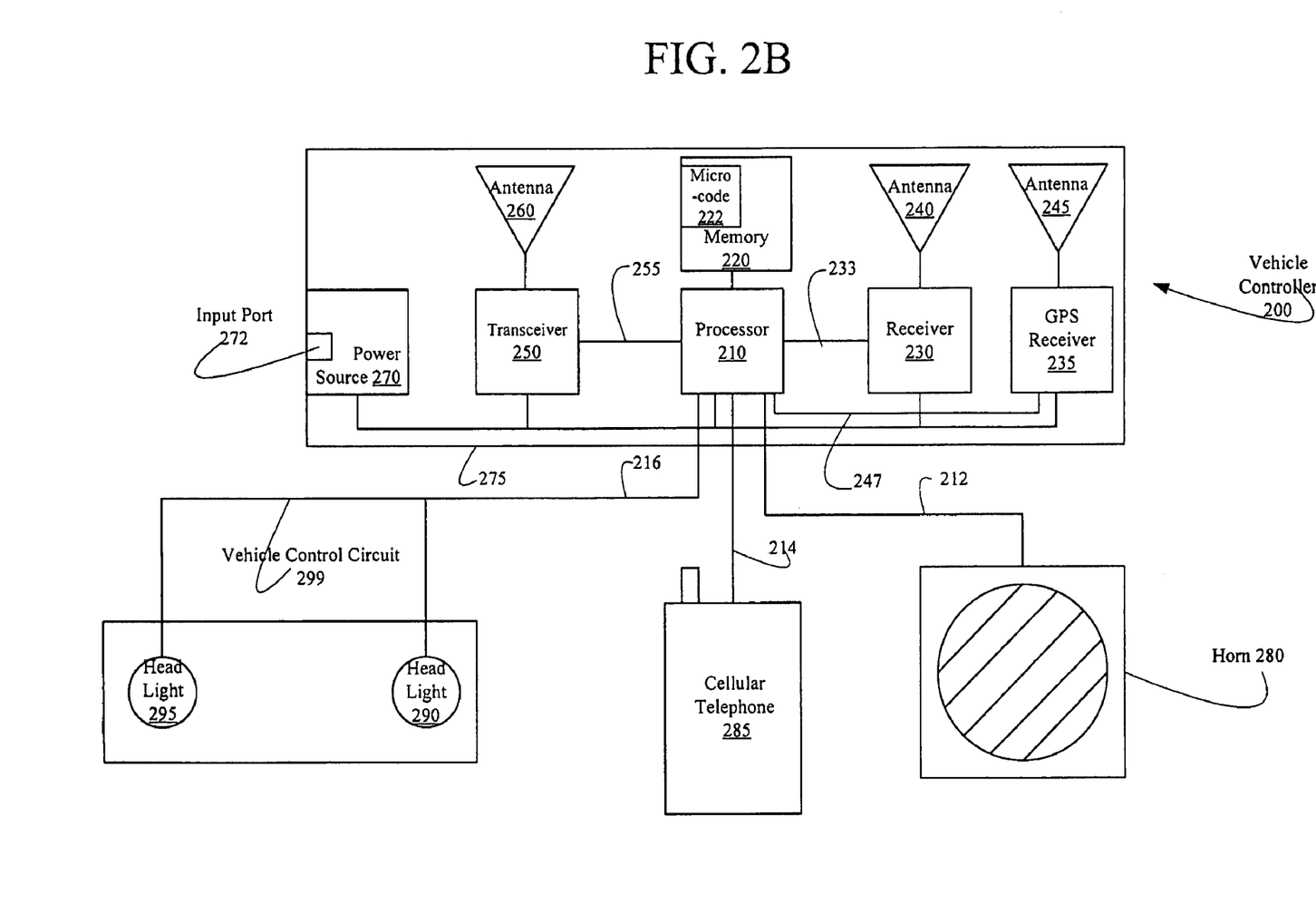
FIG. 2B is a block diagram illustrating a second embodiment of Applicants' vehicle controller assembly.

The IEEE Specification specifies an over-the-air interface between a wireless client, such as for example device 100, and a base station such as Applicants' vehicle controller 200 (FIGS. 2A, 2B). There are several specifications in the 802.11 family, including (i) specification 802.11 which applies to wireless LANs and provides 1 or 2 Mbps transmission in the 2.4 GHz band using either frequency hopping spread spectrum (FHSS) or direct sequence spread spectrum (DSSS); (ii) specification 802.11a which comprises an extension to 802.11 that applies to wireless LANs and provides up to 54 Mbps in the 5 GHz band using an orthogonal frequency division multiplexing encoding scheme rather than FHSS or DSSS; (iii) specification 802.11b, sometimes referred to as 802.11 High Rate or Wi-Fi, which comprises an extension to 802.11 that applies to wireless LANS and provides up to about 11 Mbps transmission in the 2.4 GHz band; and/or (iv) specification 802.11g which applies to wireless LANs and provides 20+Mbps in the 2.4 GHz band.

Figure 7A:
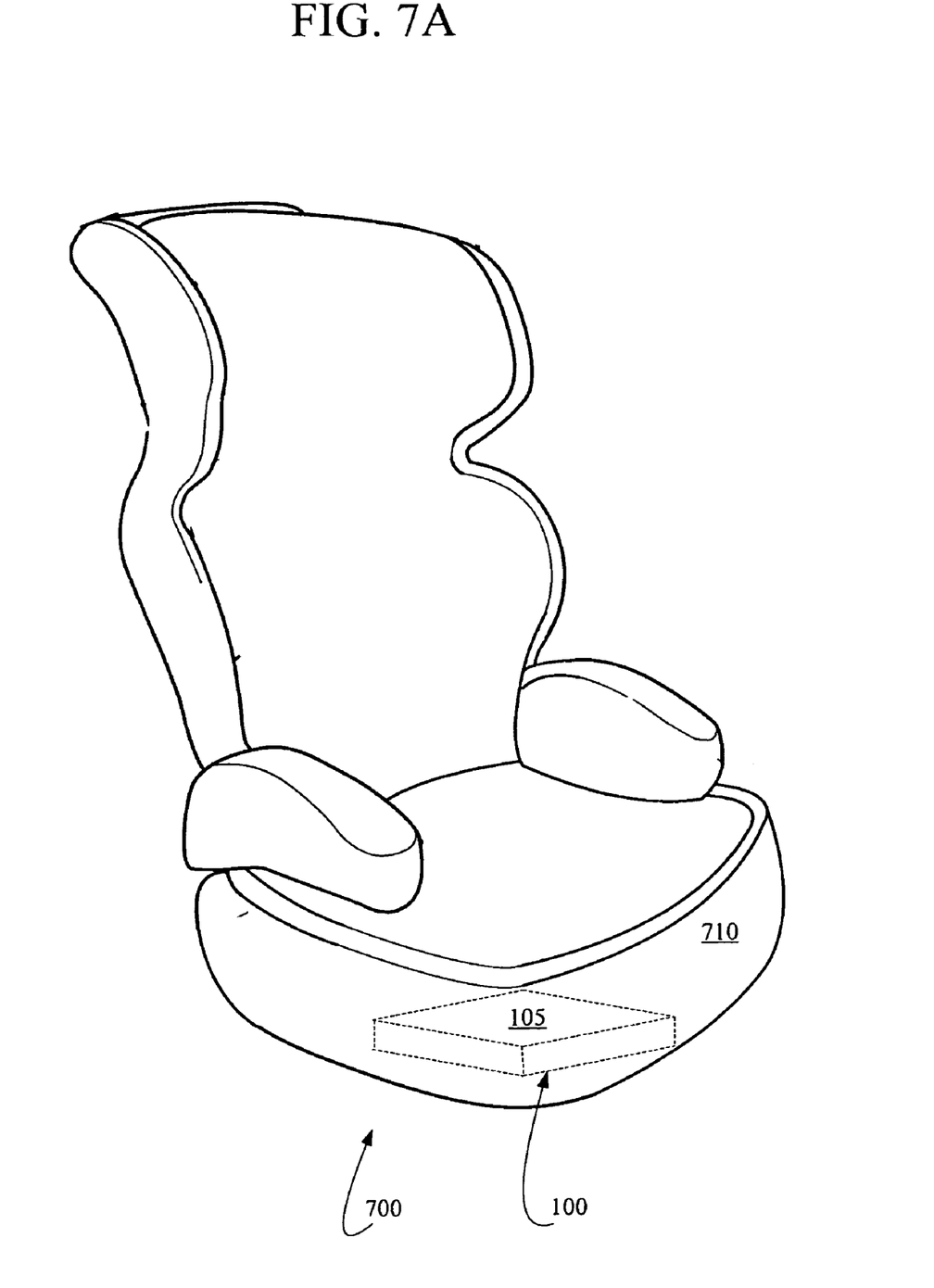
FIG. 7A illustrates a child seat comprising Applicants' monitoring assembly disposed therein.
Figure 7B:
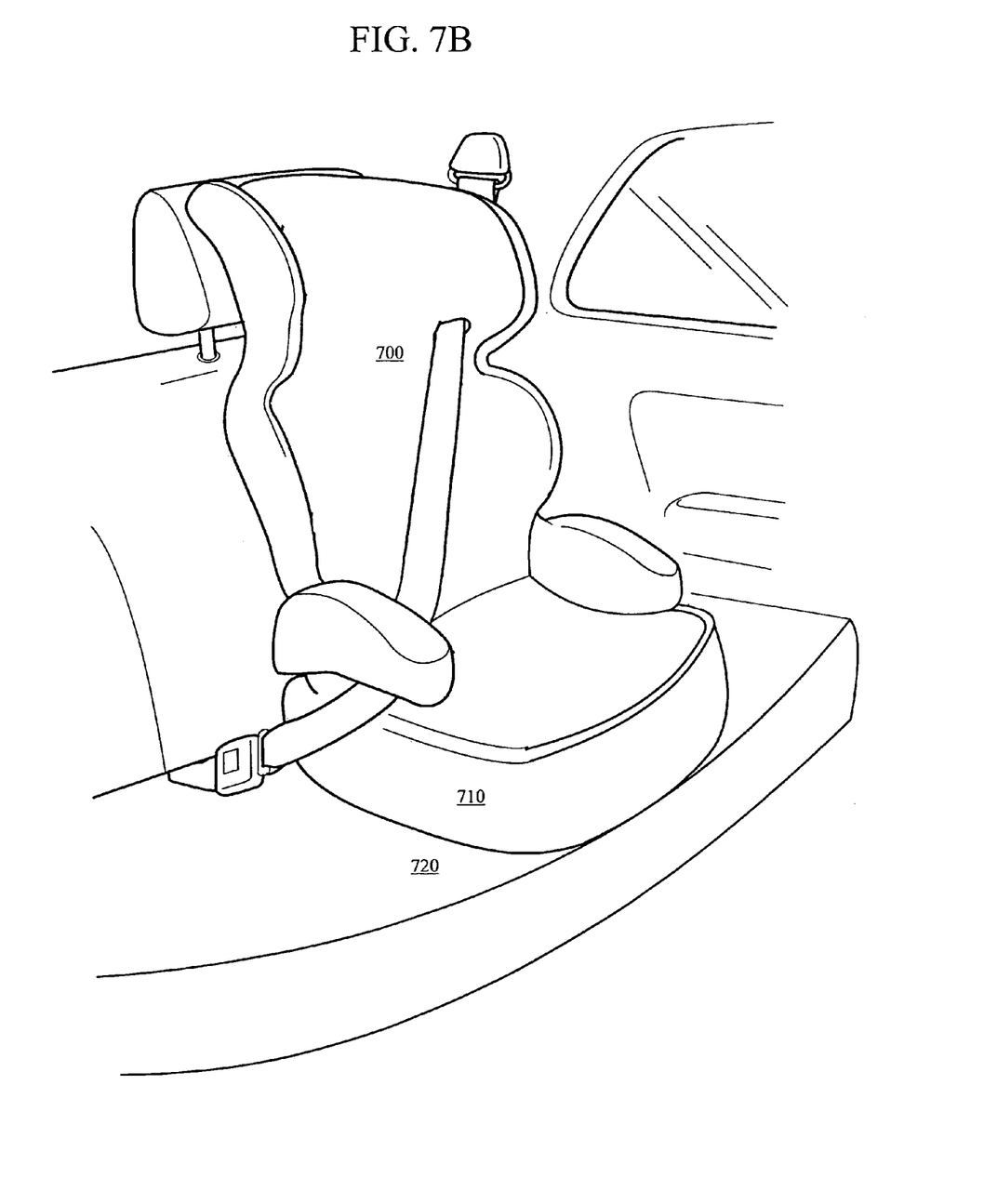
FIG. 7B is a perspective view of a child seat disposed on a vehicle seat.

Referring to FIG. 7A, in certain embodiments, Applicants' monitoring assembly 100 is disposed in a bottom portion 710 of a child's car seat 700. In certain embodiments, that child's car seat is removeably disposed in a vehicle, such as an automobile, truck, recreational vehicle, and the like. FIG. 7B illustrates in other embodiments, Applicants' monitoring assembly is disposed in a pet carrier. In certain embodiments, that pet carrier is removeably disposed in a vehicle, such as an automobile, truck, recreational vehicle, and the like. In yet other embodiments, Applicants' monitoring assembly is integral with the seat portion of a passenger seat disposed in a vehicle, such as an automobile, truck, recreational vehicle, and the like.

Figure 7C:
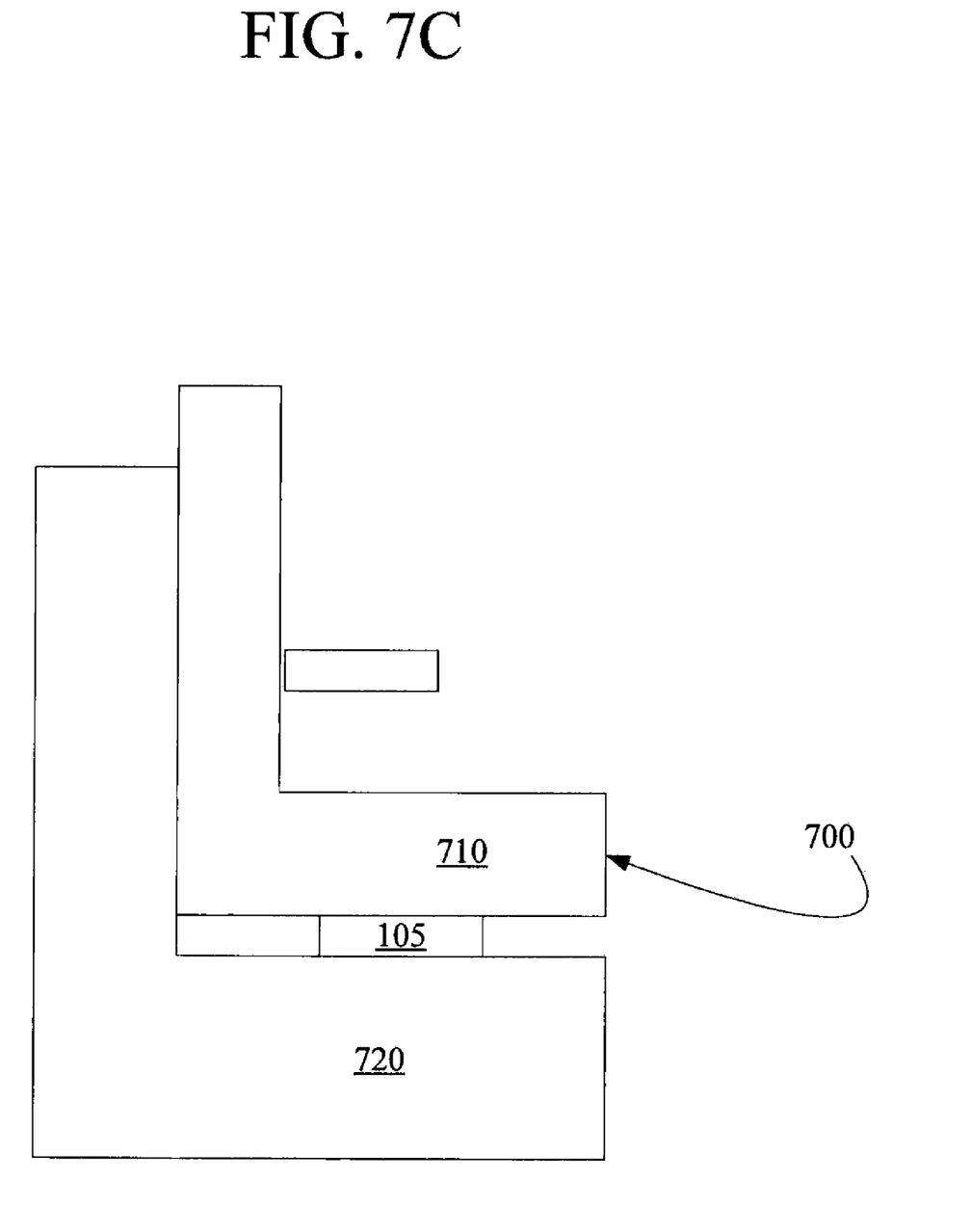
FIG. 7C is a side view of the apparatus of FIG. 7B showing Applicants' monitoring assembly 100 disposed between the car seat and the vehicle seat.

In other embodiments, Applicants' monitoring assembly 100 comprises housing 105. Referring to FIGS. 7B and 7C, in use, housing 105 is removeably disposed between the bottom portion 710 of a child's car seat 700 or pet carrier and a vehicle seat 720.

Figure 6:
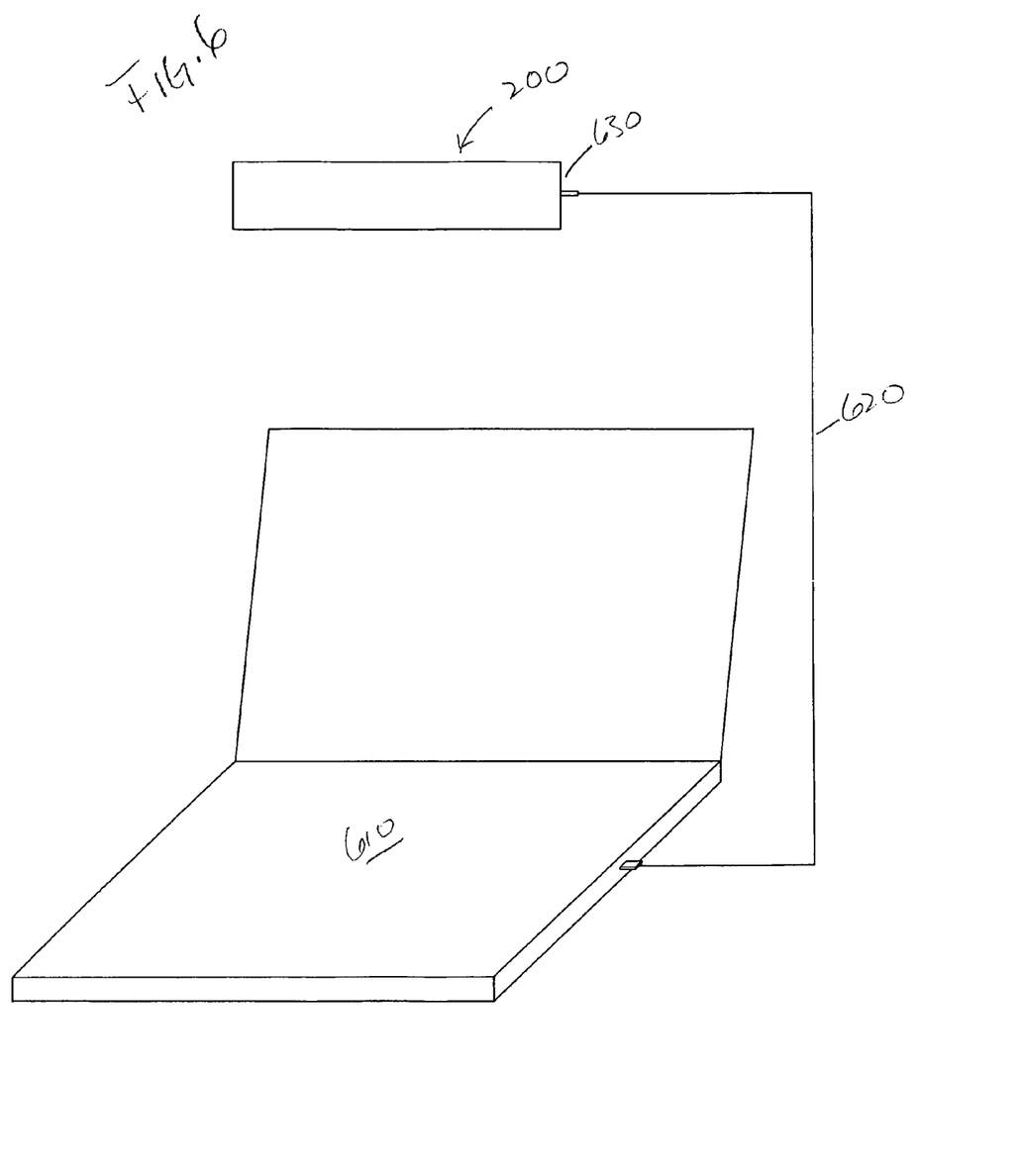
FIG. 6 is a perspective view showing a computing device releaseably interconnected with Applicants' vehicle controller assembly.

Referring now to FIGS. 2A and 2B, Applicants' vehicle controller 200 comprises processor 210, memory 220, receiver 230, first antenna 240, transceiver 250, second antenna 260, and power source 270. Applicants' controller assembly 200 can be disposed anywhere in the vehicle. For example, in certain embodiments, controller assembly 200 is disposed on he dash board of the vehicle. Referring now to FIG. 6, in certain embodiments, vehicle controller 200 comprises one or more USB and/or FIRE WIRE ports 630. A computing device 610 may be coupled to vehicle controller assembly 200 using communication link 620, wherein communication link 620 comprises the appropriate connector hardware to interface with port 630. In these embodiments, information, such as and without limitation the threshold weight of step 450 (FIG. 4), can be entered into memory 220 using the interconnected computing device 610.

In other embodiments, controller assembly 200 is disposed behind the dash board of the vehicle. In other embodiments, controller assembly 200 is disposed in the engine compartment. In still other embodiments, controller assembly 200 is disposed on the floor beneath one of the car seats.

As those skilled in the art will appreciate, the vehicle comprising Applicants' monitoring assembly 100 and Applicants' vehicle controller assembly 200 further comprises a plurality of control circuits, wherein one or more of those control circuits operates the vehicle horn assembly, such as horn assembly 280, and wherein one or more of those control circuits operate the vehicle head lights, such as head lights 290 and 295.

In the illustrated embodiment of FIGS. 2A and 2B, processor 210 is interconnected with horn 280 via communication link 212. In certain embodiments, communication link 212 interconnects processor 210 with the one or more vehicle control circuits 298 that operate horn 280.

In the illustrated embodiment of FIGS. 2A and 2B, processor 210 is interconnected with head lights 290 and 295 via communication link 216. In certain embodiments, communication link 216 interconnects processor 210 with the one or more vehicle control circuits 299 that operate head lights 290 and 295.

Power source 270 is interconnected with memory 220, processor 210, receiver 230, and transceiver 250 via power bus 275. In certain embodiments, power source 270 comprises one or more batteries. In certain embodiments, those one or more batteries comprise rechargeable batteries. In certain of these rechargeable battery embodiments, power source 270 comprises power input port 272 into which an external power source may be releaseably interconnected with power source 270 to recharge the one or more batteries. In certain embodiments, the external power source comprises the electrical system of vehicle in which controller assembly 200 is disposed.

Receiver 230 is interconnected with processor 210 via communication link 233. Transceiver 250 is interconnected with processor 210 via communication link 255. Memory 220 is interconnected with processor 210 via communication link 225. Communication links 225, 233, and 255, may comprise any type of I/O interface, for example and without limitation, a serial connection, parallel connection, Fibre Channel, Infiniband, Gigabit Ethernet, Ethernet, iSCSI, SCSI I/O interface, and the like.

Microcode/operating system 222 is encoded in memory 220. Processor 210 utilizes microcode/operating system 222 to operate vehicle controller 200. In certain embodiments, operating system 222 is selected from the group consisting of Windows, AIX, Unix, MVS, and LINUX. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald).

In certain embodiments, memory 220 comprises an information storage medium comprising, for example, a magnetic information storage medium, an optical information storage medium, an electronic information storage medium, and the like, in combination with hardware to read information from that information storage medium. By "electronic storage media," Applicants mean, for example, a device such as a PROM, EPROM, EEPROM, Flash PROM, compactflash, smartmedia, and the like. In certain embodiments, memory 220 comprises nonvolatile memory.

In certain embodiments, Applicants' receiver 230 transmits Bluetooth-compliant emissions at about 2.4 GHz. In certain embodiments, Applicants' receiver 230 transmits wireless signals compliant with one or more of the embodiments of the IEEE Specification.

Figure 3:
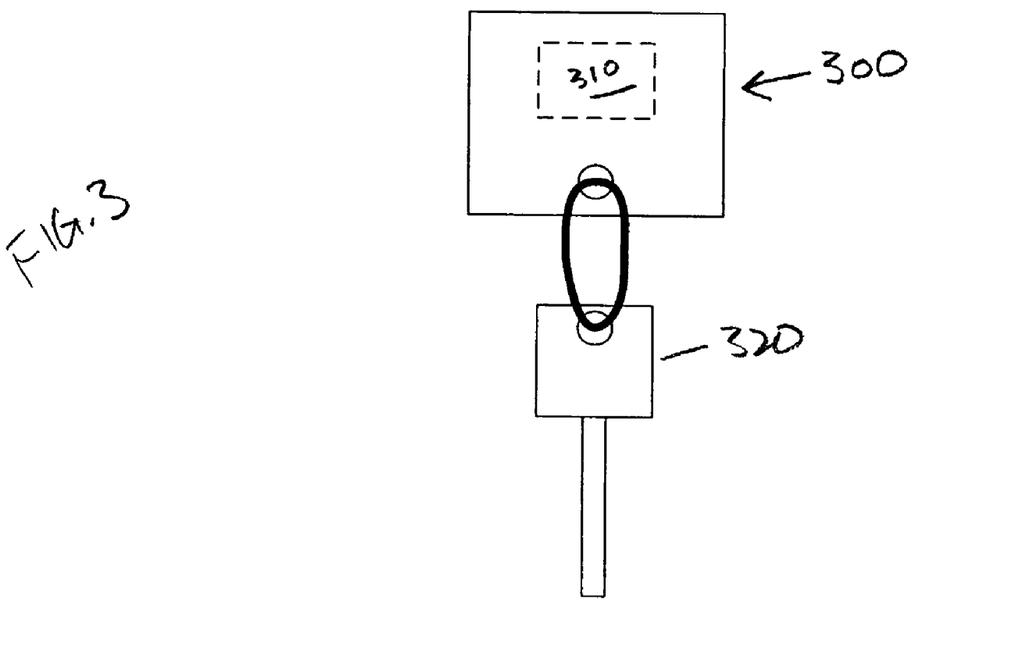
FIG. 3 is a block diagram illustrating Applicants' key fob.

Referring now to FIGS. 2A, 2B, and 3, in certain embodiments, Applicants' transceiver 250 comprises an RFID reader. In certain embodiments, Applicants' apparatus and method utilize radio frequency identification ("RFID") technology to communicate between controller assembly 200 and the vehicle key fob 300 (FIG. 3). In these embodiments, the key fob 300 comprises RFID circuit 310, sometimes referred to as an "RFID tag." RFID reader 250 transmits a radio frequency signal which interrogates RFID tag 310.

Figure 4:
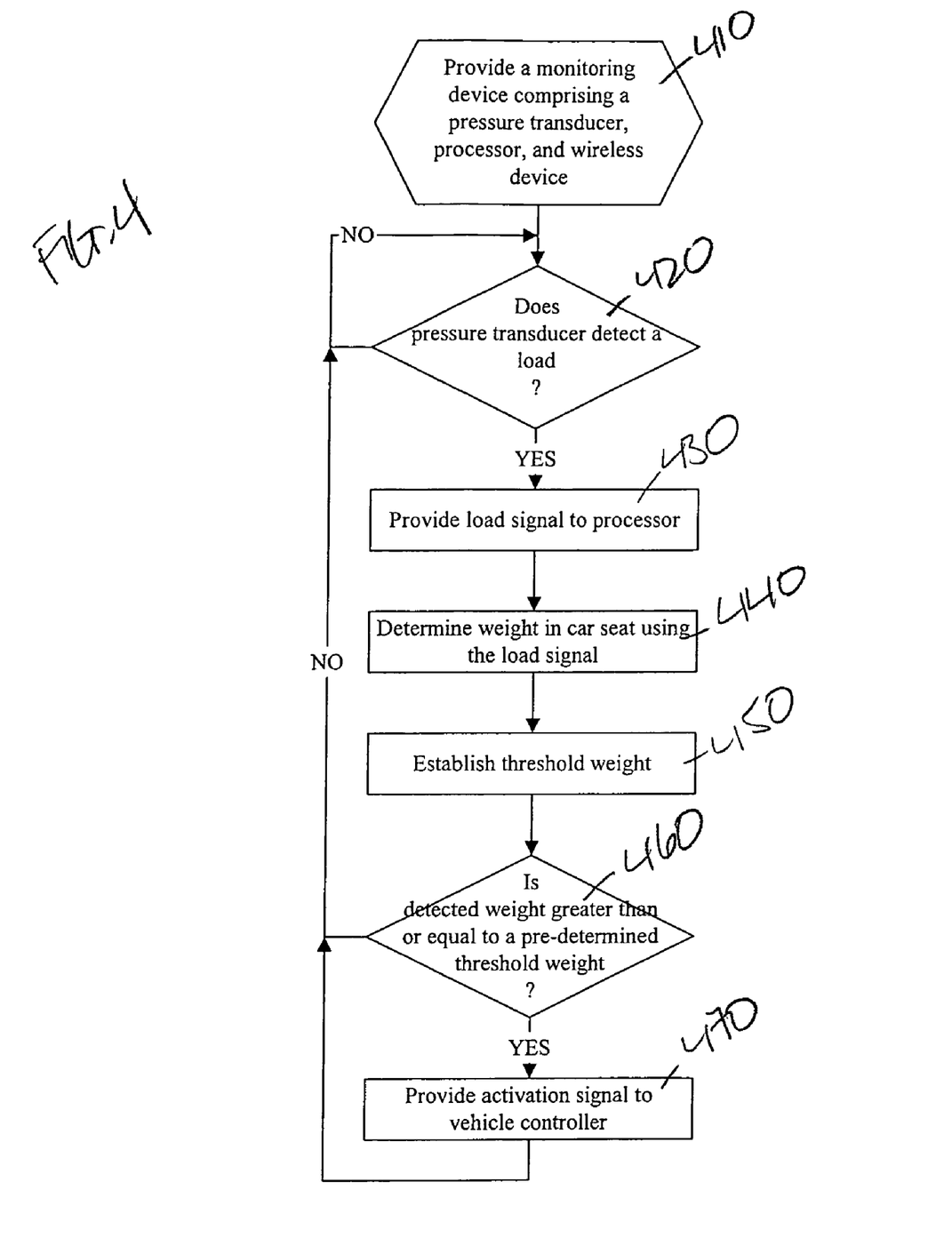
FIG. 4 is a flow chart summarizing the initial steps in Applicants' method.

Applicants' invention comprises a method to determine the presence of a child/pet in a vehicle. Referring now to FIG. 4, in step 410 Applicants' method provides a monitoring assembly, such as monitoring assembly 100 (FIG. 1), comprising a pressure transducer, such as pressure transducer 110 (FIG. 1), a processor, such as processor 150 (FIG. 1), and monitoring transmitter 160 (FIG. 1).

In step 420, Applicants' method determines if the pressure transducer detects a load. In the event a child is placed in a car seat comprising Applicants' device 100, then pressure transducer 110 detects a load, and in step 430 provides a load signal to processor 150 via communication link 115, wherein that load signal is proportionate in strength to the weight detected by pressure transducer 110. Pressure transducer 110 continues to provide load signals to processor 150 as long as the pressure transducer detects a load.

In step 440, Applicants' method determines the weight placed onto the child car seat using the load signal. In certain embodiments, step 440 is performed by pressure transducer 110. In certain embodiments, step 440 is performed by processor 150.

In step 450, Applicants' method establishes a threshold weight. In certain embodiments, the threshold weight of step 450 is set by the manufacturer of the monitoring assembly provided in step 410. In other embodiments, the threshold weight is set by the user, using for example an external computing device 610 (FIG. 6), as described hereinbelow.

In step 460, Applicants' method determines if the weight detected by pressure transducer 110 is equal to or greater than the threshold weight of step 450. In certain embodiments, step 460 is performed by processor 150.

If Applicants' method determines in step 460 that the weight detected by pressure transducer 110 is equal to or greater than the threshold weight of step 450, then in step 470 Applicants' method provides activation signals to a vehicle controller, such as vehicle controller assembly 200, via monitoring transmitter 160 and antenna 170. In the event pressure transducer 110 no longer detects a load, then pressure transducer 110 stops providing load signals to processor 150. If processor 150 no longer receives load signals from pressure transducer 110, then processor 150 does not cause monitoring transmitter 160 to emit activation signals.

In certain embodiments, in step 430 the load signal is provided by the monitoring assembly 100 using monitoring transmitter 160 to a vehicle controller, such as vehicle controller assembly 200. In these embodiments, steps 440, 460, and 470, are performed by the vehicle controller.

Figure 5:
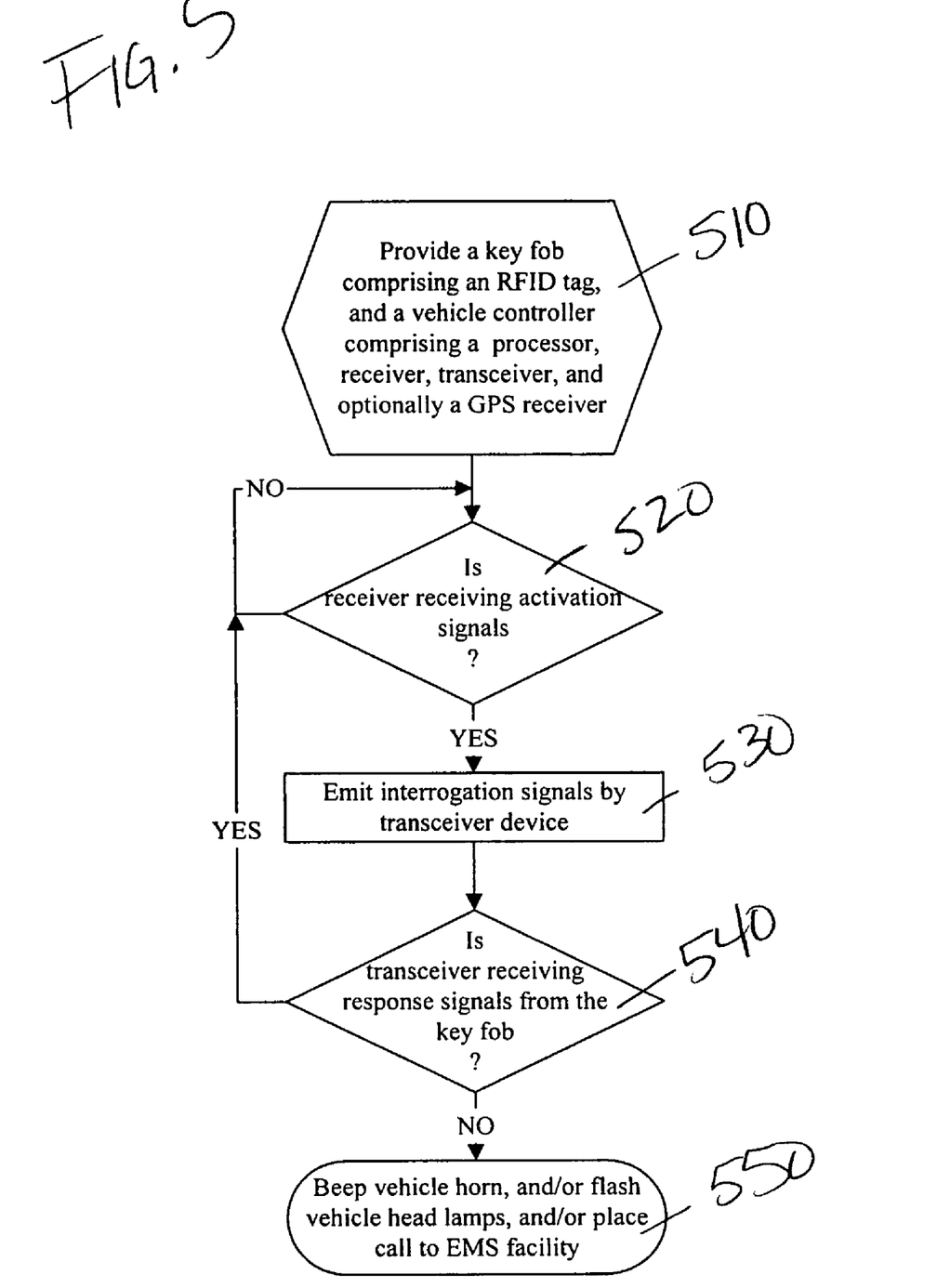
FIG. 5 is a flow chart summarizing additional steps in Applicants' method.

Referring now to FIG. 5, in step 510 Applicants' method provides a key fob, such as key fob 300 (FIG. 3), comprising an RFID circuit, such as RFID circuit 310 (FIG. 3). In step 510 Applicants' method further provides a vehicle controller assembly comprising a processor, a receiver, such as receiver 230 (FIGS. 2A, 2B), a transceiver, such as transceiver 250 (FIGS. 2A, 2B), and optionally a global positioning satellite ("GPS") receiver, such as GPS receiver 235 (FIG. 2B).

In step 520, Applicants' method determines if receiver 230 is receiving activation signals from Applicants' monitoring assembly, such as monitoring assembly 100 (FIG. 1). In certain embodiments, step 520 is performed by processor 210. If Applicants' method determines in step 520 that activation signals are not being received, then the method continues to monitor for such activation signals.

Alternatively, if Applicants' method does determine in step 520 that receiver 230 is receiving activation signals from monitoring assembly 100, then Applicants' method transitions from step 520 to step 530 wherein the method causes the transceiver to emit interrogation signals. In certain embodiments, step 530 is performed by processor 210.

Referring once again to FIGS. 2A and 2B, in certain embodiments Applicants' transceiver emits an RFID interrogation signal every 10 seconds. In certain embodiments, Applicants' transceiver emits an RFID interrogation signal every 30 seconds. In certain embodiments, Applicants' transceiver emits an RFID interrogation signal every 60 seconds.

Applicants' method transitions from step 530 to step 540 wherein the method determines if transceiver 250 is receiving response signals from key fob 300. In certain embodiments, step 540 is performed by processor 210 disposed in Applicants' vehicle controller.

Referring now to FIGS. 3 and 5, in certain embodiments RFID tag 310 comprises no internal power supply. An electrical current is generated in circuit 310 by an incoming interrogation signal, thereby providing sufficient power for RFID tag 310 to transmit a response comprising a unique identifier. In certain embodiments, RFID tag 310 backscatters the carrier signal from the reader.

If the key fob is within about 20 feet or less from the vehicle, Applicants' key fob emits a response signal for each received interrogation signal, and Applicants' transceiver receives those response signals. On the other hand, if the key fob is more than about 20 feet from the vehicle, then the key fob will not receive the interrogation signals, and will not provide response signals. Upon receiving a response signal from key fob 300, transceiver 250 provides a heart beat signal to processor 210. If transceiver 250 does not receive a response signal from key fob 300, then transceiver does not provide such a heart beat signal.

If Applicants' method determines in step 540 that the transceiver is receiving response signals from the key fob, then the method transitions from step 540 to step 520 and continues as described herein. Alternatively, if Applicants' method determines in step 540 that Applicants' receiver is receiving activation signals from the monitoring assembly, but processor 210 is not receiving heart beat signals from Applicants' transceiver 250, then the method transitions from step 540 to step 550 wherein the method causes the vehicle's horn 280 to beep, and optionally causes the vehicle's head lamps 290 and 295 to flash on and off. In certain embodiments, step 550 is performed by processor 210 disposed in Applicants' vehicle controller.

As those skilled in the art will appreciate, the vehicle's beeping horn and/or flashing head lamps will alert people in near vicinity that some sort of emergency exists. Upon closer inspection, the presence of the child/pet in the car will be then be ascertained, and emergency help will be summoned.

In certain embodiments, in step 550 Applicants' method causes an interconnected cell phone 285 to place a call to an EMS facility, such as for example a 911 emergency center.

Referring now to FIGS. 2B and 5, in certain embodiments Applicants' vehicle controller assembly 200 further comprises a GPS receiver 235 and GPS antenna 245. GPS receiver 235 receives power from power source 270 via power bus 275. GPS receiver 235 is interconnected with processor 210 via communication link 245. Communication link 245 may comprise any type of I/O interface, for example and without limitation, a serial connection, parallel connection, Fibre Channel, Infiniband, Gigabit Ethernet, Ethernet, iSCSI, SCSI I/O interface, and the like.

In certain embodiments, in step 550 Applicants' method determines the vehicle location using GPS receiver 235, and causes interconnected cell phone 285 to place a emergency alert to an EMS facility, such as for example a 911 emergency center, wherein that emergency alert comprises the location of the vehicle.

In certain embodiments, the vehicle comprises an ON STAR communication assembly. In these embodiments, if receiver 230 is receiving activation signals from Applicants' monitoring assembly 100, and if processor 210 does not receive a heart beat signal from transceiver, then processor 210 activates the ON STAR communication assembly which provides an emergency signal to the ON STAR system. In certain embodiments, that ON STAR emergency signal comprises the location of the vehicle.

The embodiments of Applicants' method recited in FIGS. 4 and/or 5 may be implemented separately. Moreover, in certain embodiments, individual steps recited in FIGS. 4 and/or 5 may be combined, eliminated, or reordered.

In certain embodiments, Applicants' invention includes instructions residing in memory, such as for example memory 140 (FIG. 1), or memory 220 (FIGS. 2A, 2B), where those instructions are executed by processor 150 (FIG. 1) or processor 210 (FIGS. 2A, 2B), respectively, to perform one or more of steps 420, 430, 440, 450, and 460, recited in FIG. 4, and/or one or more of steps 520, 530, 540, and/or 550, recited in FIG. 5.

In other embodiments, Applicants' invention includes instructions residing in any other computer program product, where those instructions are executed by a computer external to, or internal to, system 300, to perform one or more of steps 420, 430, 440, 450, and 460, recited in FIG. 4, and/or one or more of steps 520, 530, 540, and/or 550, recited in FIG. 5. In either case, the instructions may be encoded to an information storage medium comprising, for example, a magnetic information storage medium, an optical information storage medium, an electronic information storage medium, and the like. By "electronic storage media," Applicants mean, for example, a device such as a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. An apparatus to detect the presence of a child in a vehicle, comprising:
    a monitoring assembly comprising a first processor, a pressure transducer in communication with said first processor, and a monitoring transmitter in communication with said first processor, wherein said pressure transducer provides a load signal to said first processor when said pressure transducer senses a load, wherein said load signal is proportionate in strength to a weight detected by pressure transducer, and wherein said first processor determines said detected weight using said load signal, and wherein said first processor causes said monitoring transmitter to emit an activation signal if said detected weight is equal to or greater than a threshold weight;
    a vehicle controller assembly comprising a second processor, a receiver in communication with said second processor, a transceiver in communication with said second processor, wherein when said receiver receives said activation signal provided by said monitoring transmitter, said transceiver provides RFID interrogation signals;
    a portable key fob comprising an RFID circuit, wherein said RFID circuit receives said RFID interrogation signals and provides response signals to said transceiver;
    wherein:
    if said transceiver receives a response signal from said key fob, said transceiver provides a heart beat signal to said second processor;
    if said transceiver does not receive a response signal from said key fob, said transceiver does not provide a heart beat signal to said second processor;
    if said receiver is receiving activation signals from said monitoring assembly, and if said second processor is not receiving heart beat signals from said transceiver, then said second processor causes an interconnected vehicle horn to beep, and interconnected vehicle head lights to flash.

2. The apparatus of claim 1, further comprising a child car seat comprising a bottom portion, wherein said monitoring assembly is disposed in said bottom portion.

3. The apparatus of claim 1, wherein said monitoring assembly further comprises one or more batteries, wherein said one or more batteries are interconnected with said first processor, said pressure transducer, and said monitoring transmitter.

4. The apparatus of claim 3, wherein said one or more batteries comprise rechargeable batteries, wherein said apparatus further comprises an external power port interconnected with said one or more rechargeable batteries.

5. The apparatus of claim 1, wherein said vehicle controller assembly is attached to a vehicle comprising a vehicular power source, wherein said vehicle controller assembly is interconnected with said vehicular power source.

6. The apparatus of claim 5, wherein said vehicle further comprises one or more vehicle control circuits, horn interconnected with said one or more vehicle control circuits, and plurality of head lights interconnected with said one or more vehicle control circuits, wherein said second processor is interconnected with said one or more vehicle control circuits.

7. The apparatus of claim 6, further comprising a cellular telephone, wherein said second processor is interconnected with said cellular telephone.

8. The apparatus of claim 7, wherein said vehicle controller assembly further comprises a global positioning satellite receiver interconnected with said second processor.

9. The apparatus of claim 1, wherein said vehicle controller assembly further comprises an external computer port interconnected with said second processor.

10. The apparatus of claim 9, wherein said external computer port is selected from the group consisting of a USB port and a FIRE WIRE port.

11. A method to detect the presence of a child in an unattended vehicle, comprising the steps of:

supplying a vehicle comprising a vehicle seat, a horn, a plurality of head lights, and one or more vehicular control circuits to operate said horn and said plurality of head lights;

disposing in said vehicle an vehicle controller assembly comprising a second processor, a receiver in communication with said second processor, a transceiver in communication with said second processor, wherein said vehicle controller assembly is in communication with said one or more vehicular circuits;

supplying a portable key fob comprising an RFID circuit, wherein said RFID circuit provides an RFID response signal in response to receiving an RFID interrogation signal provided by said transceiver;

disposing a child car seat on said vehicle seat, wherein said child car seat comprises a bottom portion;

disposing a monitoring assembly between said bottom portion of said child car seat and said vehicle seat, wherein said monitoring assembly comprises a first processor, a pressure transducer in communication with said first processor, and a monitoring transmitter in communication with said first processor, wherein said pressure transducer provides a load signal to said first processor when said pressure transducer senses a load, wherein said load signal is proportionate in strength to a weight detected by pressure transducer, and wherein said first processor determines said detected weight using said load signal, and wherein said first processor causes said monitoring transmitter to emit an activation signal if said detected weight is equal to or greater than a threshold weight;

placing a child in said child car seat, wherein said child comprises a weight;

detecting said load by said pressure transducer;

emitting said activation signal by said monitoring transmitter;

receiving said activation signal by said receiver;

emitting an RFID interrogation signal by said transceiver;

if said transceiver receives a response signal from said key fob, providing a heart beat signal to said second processor;

if said transceiver does not receive a response signal from said key fob, not providing a heart beat signal to said second processor;

if said receiver is receiving activation signals from said monitoring assembly, and if said second processor is not receiving heart beat signals from said transceiver, causing said vehicle horn to beep, and flashing said vehicle head lights, operative if said transceiver does not receive a response signal from said key fob, emitting one or more sounds from said horn.

12. The method of claim 11, further comprising the steps of:

receiving said interrogation signal by said RFID circuit;

emitting a response signal by said RFID circuit;

operative if said transceiver receives said response signal from said key fob, repeating said emitting an interrogation signal step each time said receiver receives activation signals.

13. The method of claim 11, wherein said vehicle controller assembly further comprising a cellular telephone in communication with said second processor, further comprising the step of placing an emergency telephone call using said cellular telephone if said transceiver does not receive a response signal from said key fob.

14. The method of claim 13, wherein said vehicle controller assembly further comprises a global positioning satellite receiver, further comprising the steps of:

determining the location of said vehicle using said global positioning satellite receiver; and providing said location in said emergency telephone call.

15. The method of claim 11, further comprising the steps of:

establishing a threshold weight;

providing from said pressure transducer to said first processor said load signal as long as said pressure transducer detects said load;

determining said weight using said load signal;

determining if said weight is greater than or equal to said threshold weight;

operative if said weight if greater than said threshold weight, causing said monitoring transmitter to emit said activation signal.

* * * * *

UNITED STATES PATENT AND TRADEMARK OFFICE
CERTIFICATE OF CORRECTION

PATENT NO. : 7,592,905 B2 Page 1 of 1
APPLICATION NO. : 11/477500
DATED : September 22, 2009
INVENTOR(S) : Barton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 182 days.

Signed and Sealed this

Twenty-first Day of September, 2010

David J. Kappos
*Director of the United States Patent and Trademark Office*